A. ARNOLD.
CARBURETER.
APPLICATION FILED AUG. 12, 1916.
1,222,589. Patented Apr. 17, 1917.
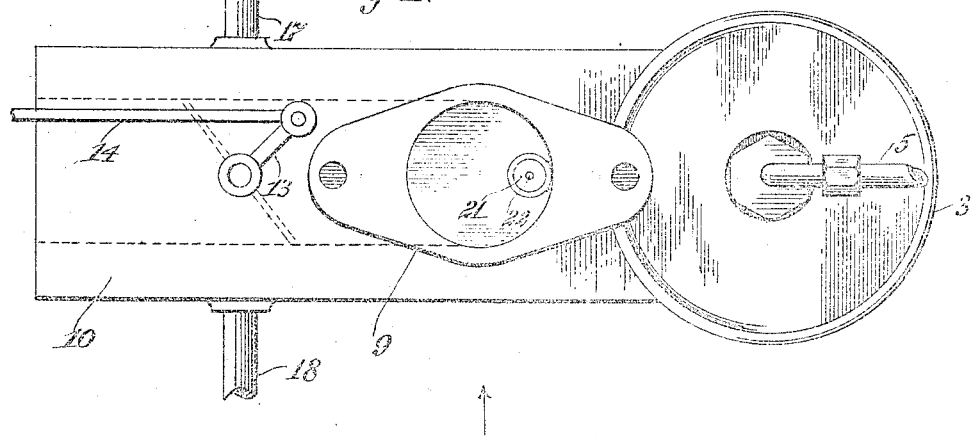
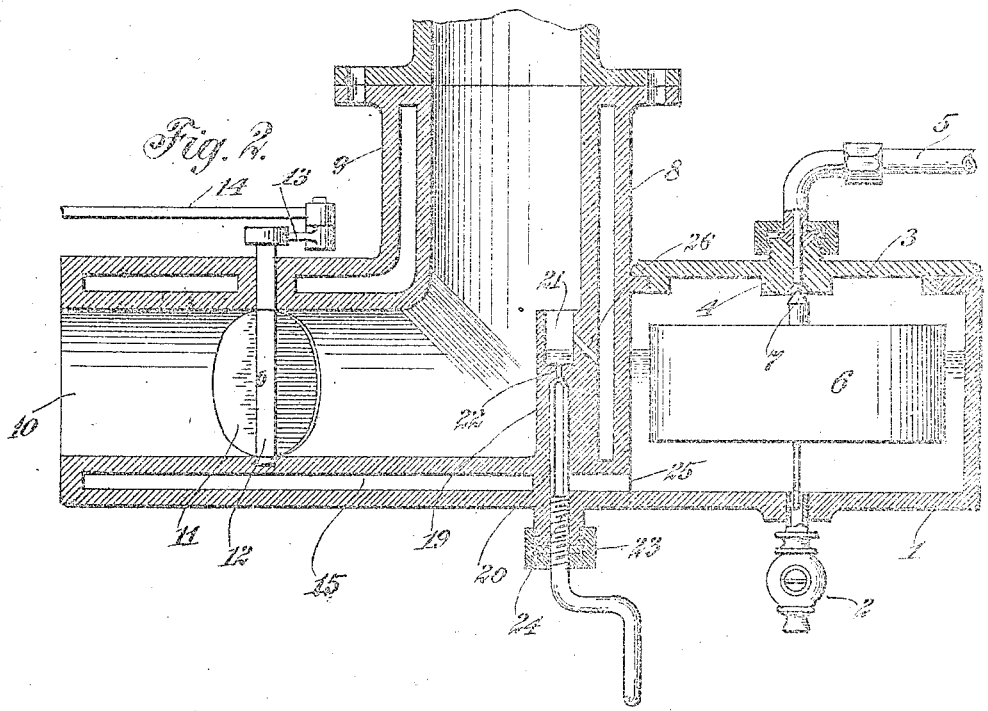
Witnesses
Charles Balg
Anna M. Dorr
Inventor
Albert Arnold
By Barthof Barth
Attorneys

UNITED STATES PATENT OFFICE.

ALBERT ARNOLD, OF BAY CITY, MICHIGAN.

CARBURETER.

1,222,589.

Specification of Letters Patent.

Patented Apr. 17, 1917.

Application filed August 12, 1916. Serial No. 114,492.

*To all whom it may concern:*

Be it known that I, ALBERT ARNOLD, a citizen of the United States of America, residing at Bay City, in the county of Bay and State of Michigan, have invented certain new and useful Improvements in Carbureters, of which the following is a specification, reference being had therein to the accompanying drawings.

This invention relate to carbureters and the primary object of my invention is to provide a carbureter wherein part of the exhaust of a manifold from an internal combustion engine may be utilized to assist in vaporizing gasolene or other fuel let into the carbureter.

Another object of my invention is to provide a carbureter wherein the exhaust of an engine may be utilized for heating walls of a carbureter, so that air and fuel admitted to the carbureter will be in better condition, when commingled for explosive purposes in the cylinders of an engine.

A further object of my invention is to provide a carbureter of the above type consisting of comparatively few parts that are inexpensive to manufacture, durable, easy to assemble, and highly efficient in connection with an internal combustion engine.

The above and other objects are attained by a mechanical construction that will be hereinafter specifically described and then claimed, and reference will now be had to the drawings, wherein—

Figure 1 is a plan of the carbureter, and

Fig. 2 is a longitudinal sectional view of the same.

In the drawings, 1 denotes a float chamber having a drain cock 2, and a detachable cover or cap 3, said cover having an inlet orifice 4 in communication with a fuel supply pipe or conduit 5. Within the chamber 1 is a float 6 provided with a needle valve 7 movable to and from the orifice 4 to automatically regulate the intake of fuel to the chamber 1 and the level of fuel therein. The elements just described are of a conventional form common in a great many carbureters.

A wall of the float chamber 1 is integral with a wall 8 of an elbow 9 constituting a carbureter body. The lateral portion 10 of the elbow 9 is in a plane with the float chamber 1 and this lateral portion of the elbow constitutes the air inlet to the carbureter body, and the supply of air is controlled by a throttle or butterfly valve 11 mounted upon a rock shaft 12 adjusted through the medium of a crank 13 and a rod 14.

The carbureter body is adapted to be attached to the intake manifold of an internal combustion engine in the usual and well known manner, and the walls of the elbow or carbureter body 9 are chambered or hollowed out, as at 15, whereby the elbow or carbureter will have outer and inner walls with an intervening space or chamber adapted to receive the exhaust from the manifold of an internal combustion engine so that the inner wall of the carbureter body or elbow will be heated. For this purpose, the lateral portion 10 of the carbureter has connections 16 and 17, either one of which may be connected to the exhaust manifold of an internal combustion engine, so that the exhaust may circulate or pass through the chambers of the elbow or carbureter body.

The outer angle of the elbow or carbureter body 9 contiguous to the integral wall of the float chamber 1, has an inner vertically disposed enlargement 19 provided with a port 20, a well 21 and a restricted port 22 establishing communication between the well 21 and the port 20. The lower end of the port 20 opens into a stuffing box 23 and adjustable therein is a needle valve 24 movable to and from the restricted port 22. The port 20 communicates with the float chamber 1, through a lateral port 25, consequently the fuel within the float chamber 1 will find its level within the well 21 of the enlargement 19 and the supply of fuel through the well may be regulated by the needle valve 24. The well 21 is in communication with the chambers of the elbow or carbureter body 9 through the medium of an angularly disposed or upwardly directed port 26 adapted to emit engine exhaust and eject fuel from the well 21. As the exhaust from the manifold of an internal combustion engine is under pressure, there will be a jet of exhaust gases from the port 26 tending to lift the contents of the well 21 and coöperate with the usual suction from the intake manifold of an engine in vaporizing the fuel and supplying the engine. The amount of heat discharged into the chambered walls of the carbureter is sufficient to heat air drawn into the carbureter and gasify the fuel as it enters the well 21, such gasifying being further enhanced by the hot exhaust gases emitted by the port 26.

One embodiment of my invention has been illustrated, but it is to be understood that the structural elements are susceptible to such variations and modifications as fall within the scope of the appended claims.

What I claim is:—

1. A carbureter having the walls thereof chambered and adapted for communication with the exhaust manifold of an internal combustion engine, a float chamber forming part of said carbureter, and an enlargement in said carbureter provided with a well in communication with said float chamber and with the chambers in the walls of said carbureter so that the exhaust gases assist in providing an efficient explosive mixture.

2. A carbureter having the walls thereof chambered and adapted to receive the exhaust gases from an internal combustion engine, a float chamber, an enlargement in said carbureter provided with a well communicating with the chambers in the carbureter walls and also with said float chamber, and means controlling the communication between said float chamber and the well of said enlargement.

3. A carbureter having the walls thereof provided with chambers adapted to receive exhaust gases of an internal combustion engine, a float chamber, an enlargement in said carbureter having a well, said enlargement having ports establishing communication between said well and said float chamber, said enlargement having an angularly disposed and upwardly directed port to establish communication between the well of said enlargement and the chambers of the carbureter walls, and means controlling the communication between the well of said enlargement and said float chamber.

4. In a carbureter, a float chamber, an enlargement in said carbureter having a well communicating with said float chamber, and means adapted for conveying the exhaust gases of an internal combustion engine around said carbureter and into said carbureter above said wall.

In testimony whereof I affix my signature in the presence of two witnesses.

ALBERT ARNOLD.

Witnesses:
LORENZO A. ROELLER,
JAS. A. WHITE.